(12) United States Patent
Cirucci (10) Patent No.: US 11,966,041 B2
(45) Date of Patent: Apr. 23, 2024

(54) OPTICAL MODULE

(71) Applicant: Zygo Corporation, Middlefield, CT (US)

(72) Inventor: Nicholas Mark Cirucci, Rocky Hill, CT (US)

(73) Assignee: Zygo Corporation, Middlefield, CT (US)

(*) Notice: Subject to any disclaimer, the term of this patent is extended or adjusted under 35 U.S.C. 154(b) by 154 days.

(21) Appl. No.: 17/883,954

(22) Filed: Aug. 9, 2022

(65) Prior Publication Data

US 2023/0058624 A1 Feb. 23, 2023

Related U.S. Application Data

(60) Provisional application No. 63/231,768, filed on Aug. 11, 2021.

(51) Int. Cl.
| | |
|---|---|
| *G02B 25/00* | (2006.01) |
| *G02B 25/02* | (2006.01) |
| *G02B 27/30* | (2006.01) |

(52) U.S. Cl.
CPC ........... *G02B 25/001* (2013.01); *G02B 25/02* (2013.01); *G02B 27/30* (2013.01)

(58) Field of Classification Search
CPC ....... G02B 25/001; G02B 25/02; G02B 27/30
USPC ........ 359/644, 645, 753, 771, 772, 782, 791
See application file for complete search history.

(56) References Cited

U.S. PATENT DOCUMENTS

| | | | |
|---|---|---|---|
| 754,076 | A | 3/1904 | König |
| 873,870 | A | 12/1907 | König |
| 873,871 | A | 12/1907 | König |
| 1,553,211 | A | 9/1925 | Barr et al. |

(Continued)

FOREIGN PATENT DOCUMENTS

| | | |
|---|---|---|
| CN | 107024766 | 5/2019 |
| CN | 111624735 | 9/2020 |
| WO | WO 2019/184367 | 10/2019 |

OTHER PUBLICATIONS

The International Search Report and Written Opinion of the International Searching Authority for International Application No. PCT/US2022/074691 dated Dec. 6, 2022.

*Primary Examiner* — William Choi
(74) *Attorney, Agent, or Firm* — Fish & Richardson P.C.

(57) ABSTRACT

An optical module comprising: at least three lens elements, wherein the lens elements collectively set a numerical aperture NA, a field height FH, and a system effective focal length EFLsys for directing the light rays between first and second planes, wherein NA, FH, and EFLsys satisfy $0<NA<0.25$ and $0<FH<(0.4) \cdot (EFLsys)$; wherein first and second adjacent lens elements having effective focal lengths EFL1 and EFL2, respectively, satisfies $(1.5) \cdot (EFLsys) <EFL1<3 \cdot (EFLsys)$ and $(1.5) \cdot (EFLsys)<EFL2<3 \cdot (EFLsys)$; wherein an air-distance between the first and second lens elements $A_{12}$ satisfies $0<A_{12}<EFLsys$; wherein a third lens element adjacent the second lens elements opposite the first lens element and having an effective focal length EFL3 satisfies $(-20) \cdot EFLsys<EFL3<(-1) \cdot EFLsys$; and wherein an air-distance between the second and third lens elements $A_{23}$ satisfies $0<A_{23}<EFLsys$.

28 Claims, 10 Drawing Sheets

(56) References Cited

U.S. PATENT DOCUMENTS

| | | | |
|---|---|---|---|
| 2,307,211 A | 1/1943 | Goldsmith | |
| 2,313,460 A | 3/1943 | Warmisham | |
| 2,392,979 A | 1/1946 | Louden | |
| 5,589,978 A | 12/1996 | Fantone | |
| 5,633,753 A | 5/1997 | Fantone et al. | |
| 5,696,635 A | 12/1997 | Kastner | |
| 6,130,785 A | 10/2000 | Abe et al. | |
| 7,894,141 B2 * | 2/2011 | Do | G02B 9/12 359/716 |
| 2019/0179116 A1 | 6/2019 | Huang et al. | |

* cited by examiner

OPTICAL MODULE

CROSS REFERENCE TO RELATED APPLICATION

This application claims priority to U.S. Provisional Patent Application No. 63/231,768, filed on Aug. 11, 2021, pursuant to 35 USC § 119. The entire contents of this provisional application is herein incorporated by reference in its entirety.

FIELD

This disclosure relates to an optical module, such as an eyepiece or an optical module functionally equivalent to an eye-piece and used in larger optical systems.

BACKGROUND

Eyepieces are used to magnify an object and image it, with the object and image being either finite or infinite conjugates. Eyepieces like these may be used in applications such as interferometers, telescopes, polarimeters, and spectrometers, among others. Generally, an eyepiece, or an optical system functionally equivalent to an eyepiece, will cause rays emerging from different field points of any angle, or different bundles of parallel rays at any angle, in an object plane to be combined to common field points in the image plane. One historical design for an eyepiece is the Ramsden eyepiece, which comprises two plano-convex lenses of the same glass and similar focal lengths, placed less than one eye-lens focal length apart, and typically with the convex sides facing one another.

SUMMARY

In general, in one aspect, disclosed is an optical module for directing light rays between a first plane and a second plane. The optical module includes:
 a. at least three lens elements, wherein the lens elements collectively set a numerical aperture NA and a field height FH for directing the light rays between the first and second planes, and further collectively set a system effective focal length EFLsys, wherein NA, FH, and EFLsys satisfy:
  i. $0<NA<0.25$; and
  ii. $0<FH<(0.4) \cdot (EFLsys)$,
 b. wherein the at least three lens elements include first and second adjacent lens elements having effective focal lengths EFL1 and EFL2, respectively, satisfying:
  i. $(1.5) \cdot (EFLsys)<EFL1<3 \cdot (EFLsys)$; and
  ii. $(1.5) \cdot (EFLsys)<EFL2<3 \cdot (EFLsys)$,
 c. wherein an air-distance between the first and second lens elements $A_{12}$ satisfies:
  i. $0<A_{12}<EFLsys$,
 d. wherein the at least three lens elements includes a third lens element adjacent the second lens elements opposite the first lens element and having an effective focal length EFL3 satisfying:
  i. $(-20) \cdot EFLsys<EFL3<(-1) \cdot EFLsys$, and
 e. wherein an air-distance between the second and third lens elements $A_{23}$ satisfies:
  i. $0<A_{23}<EFLsys$.

Embodiments of the optical module may include any of the following features.

For example, in certain embodiments, $0.05<NA<0.25$; and $(0.05) \cdot (EFLsys)<FH<(0.4) \cdot (EFLsys)$.

Furthermore, in certain embodiments, $(-10) \cdot (EFLsys)<EFL3<(-1) \cdot (EFLsys)$ and $0<A_{23}<(0.3) \cdot (EFLsys)$, or even more specifically, $(-10) \cdot (EFLsys)<EFL3<(-4) \cdot (EFLsys)$, or even more specifically, $(-8) \cdot (EFLsys)<EFL3<(-4) \cdot (EFLsys)$. Moreover, in any of such embodiments, $(1.5) \cdot (EFLsys)<EFL1<(2.5) \cdot (EFLsys)$ and $(1.5) \cdot (EFLsys)<EFL2<(2.5) \cdot (EFLsys)$. Moreover, in certain of these embodiments, the at least three lens elements includes exactly three lens elements.

Furthermore, for example, in certain embodiments, the at least three lens elements includes a fourth lens element adjacent the first lens element opposite the second lens element and having an effective focal length EFL4, and wherein an air-distance $A_{41}$ between the fourth and first lens elements satisfies: $0<A_{41}<EFLsys$. Certain embodiments may further satisfy: $(-20) \cdot (EFLsys)<EFL3<(-1) \cdot (EFLsys)$; and $(-20) \cdot (EFLsys)<EFL4<(-1) \cdot (EFLsys)$, or more narrowly, $(-20) \cdot (EFLsys)<EFL3<(-5) \cdot (EFLsys)$; and $(-20) \cdot (EFLsys)<EFL4<(-5) \cdot (EFLsys)$. Moreover, in certain of these embodiments, the at least three lens elements includes exactly four lens elements.

In certain embodiments, the at least three lens elements are configured to cause light rays having common angles at one plane to correspond to light rays having common field points in the other plane. For example, in some cases the light rays having common angles include different bundles of parallel light rays incident on an image plane over a range of angles and wherein the at least three lens elements are configured to cause the light rays in each bundle to result from light rays emerging from a corresponding one of the common field points in an object plane, and wherein the NA and FH correspond to the light rays emerging from the object plane. Alternatively, in other cases, the light rays having common angles include different bundles of parallel light rays emerging from an object plane over a range of angles and wherein the at least three lens elements are configured to cause the light rays in each bundle to be combined at a corresponding one of the common field points in the image plane, and wherein the NA and FH correspond to the light rays being combined in the image plane.

In certain embodiments, the lens elements provide diffraction-limited imaging between the object and image planes. For example, in certain embodiments, the diffraction limited imaging means that a peak-valley wavefront is no larger than 0.25 waves at any field point.

In certain embodiments, EFLsys is between 10 mm and 300 mm.

In certain embodiments, the lens elements each have a refractive index between 1.4 and 2.1 for wavelengths between 380 nm and 750 nm.

In certain embodiments, the lens elements each have at least one surface with an absolute radius of curvature between 5 mm and 1000 mm.

In certain embodiments, the adjacent first and second lens elements include convex surfaces facing one another. Furthermore, in some embodiments, the outer surfaces of the adjacent first and second lens elements are nominally flat.

In certain embodiments, the third lens element includes a convex surface facing the adjacent first and second lens elements and a concave surface opposite the adjacent first and second lens elements.

In certain embodiments with four lens elements, the fourth lens element includes a convex surface facing the adjacent first and second lens elements and a concave surface opposite the adjacent first and second lens elements. Furthermore, in some embodiments, the third lens element includes a convex surface facing the adjacent first and second lens elements and a concave surface opposite the adjacent first and second lens elements.

In another aspect, disclosed is an optical observation apparatus for use with the human eyes including the optical module described above, wherein the optical module is configured for use as an eyepiece for the optical observation apparatus. Furthermore, the optical observation apparatus may further include a magnifying or de-magnifying system coupled to the eyepiece.

In another aspect, disclosed is an optical system for observing an object, the system including: a light source for illuminating the object to cause light rays emerging from the object, a detector, and the optical module described above positioned optically between the light source and the detector for assisting imaging of the object onto the detector. Furthermore, the optical system may further include an optical collimation module position optically between the light source and the optical module for collimating the light emerging from the object.

All documents referred to herein, if any, are incorporated by reference in their entirety. In case of conflict with the present disclosure, and any document incorporated by reference, the present disclosure controls.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Embodiments disclosed herein include a modified monochromatic Ramsden eyepiece that improves upon the classic Ramsden eyepiece. In certain applications, a monochromatic light source is used with an eyepiece composed of either three or four lenses to produce a diffraction limited result across a wide range of system parameters. In certain embodiments, two of the lenses of the eyepiece are or are like a classic Ramsden eyepiece, and the additional one or two lenses correct the residual aberrations caused by the former.

Figure 1:
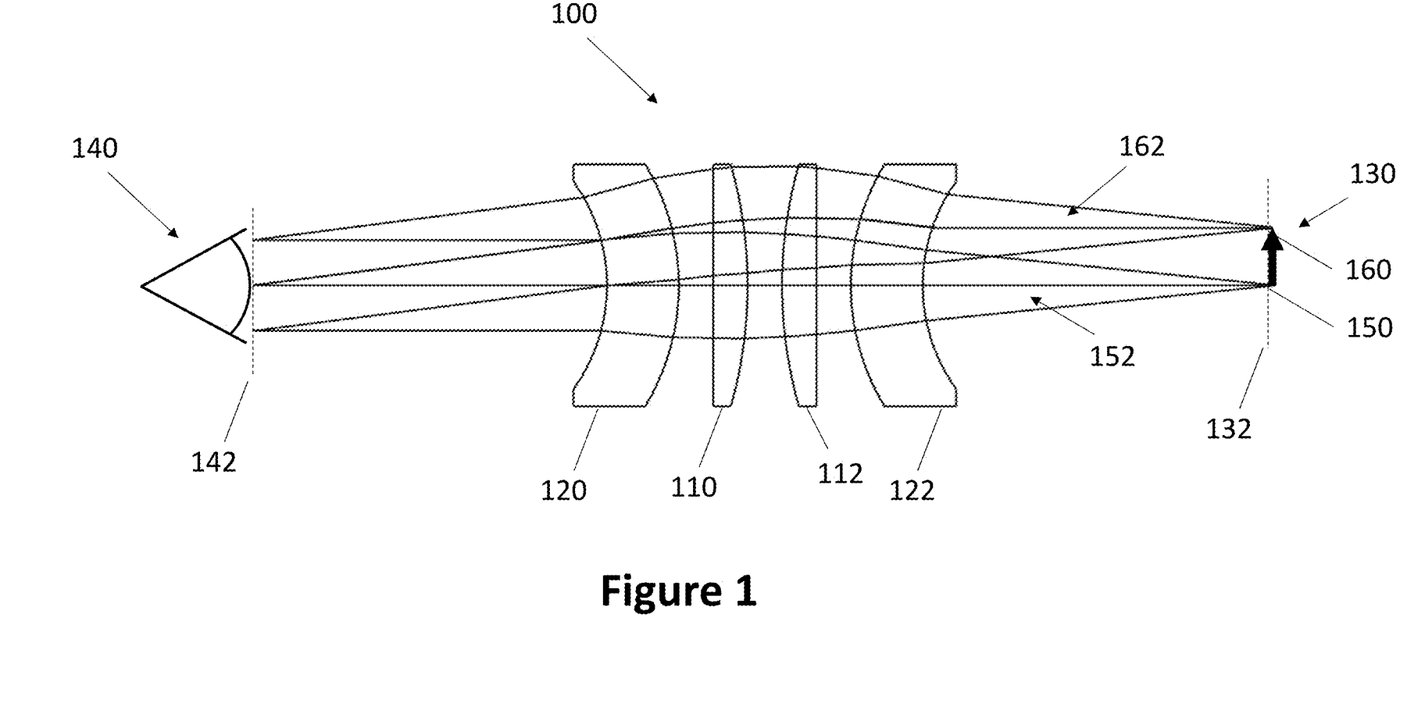
FIG. 1 is a schematic diagram of an eyepiece optical system 100 including lenses 110 and 112 generally corresponding to a classic Ramsden eyepiece and a set of one or more additional lenses 120 and 122 for improving optical performance.

FIG. 1 is a schematic diagram of an eyepiece optical system 100 including lenses 110 and 112 generally corresponding to a classic Ramsden eyepiece and a set of one or more additional lenses 120 and 122 for collectively directing light rays from a first plane 132 corresponding to an object 130 to a second plane 142 corresponding to the lens of an eye 140. Different light rays 152 emerge from an object point 150 at different angles. Similarly, different light rays 162 emerge from another object point 160 at different angles. The optical system causes subsets of lights rays 152 and 162 that emerge parallel to one another at object 130 to be combined with one another at the lens of eye 140. The eye lens then directs those combined rays onto the eye's retina (not shown) to reform the image of object 130.

Figure 2A:
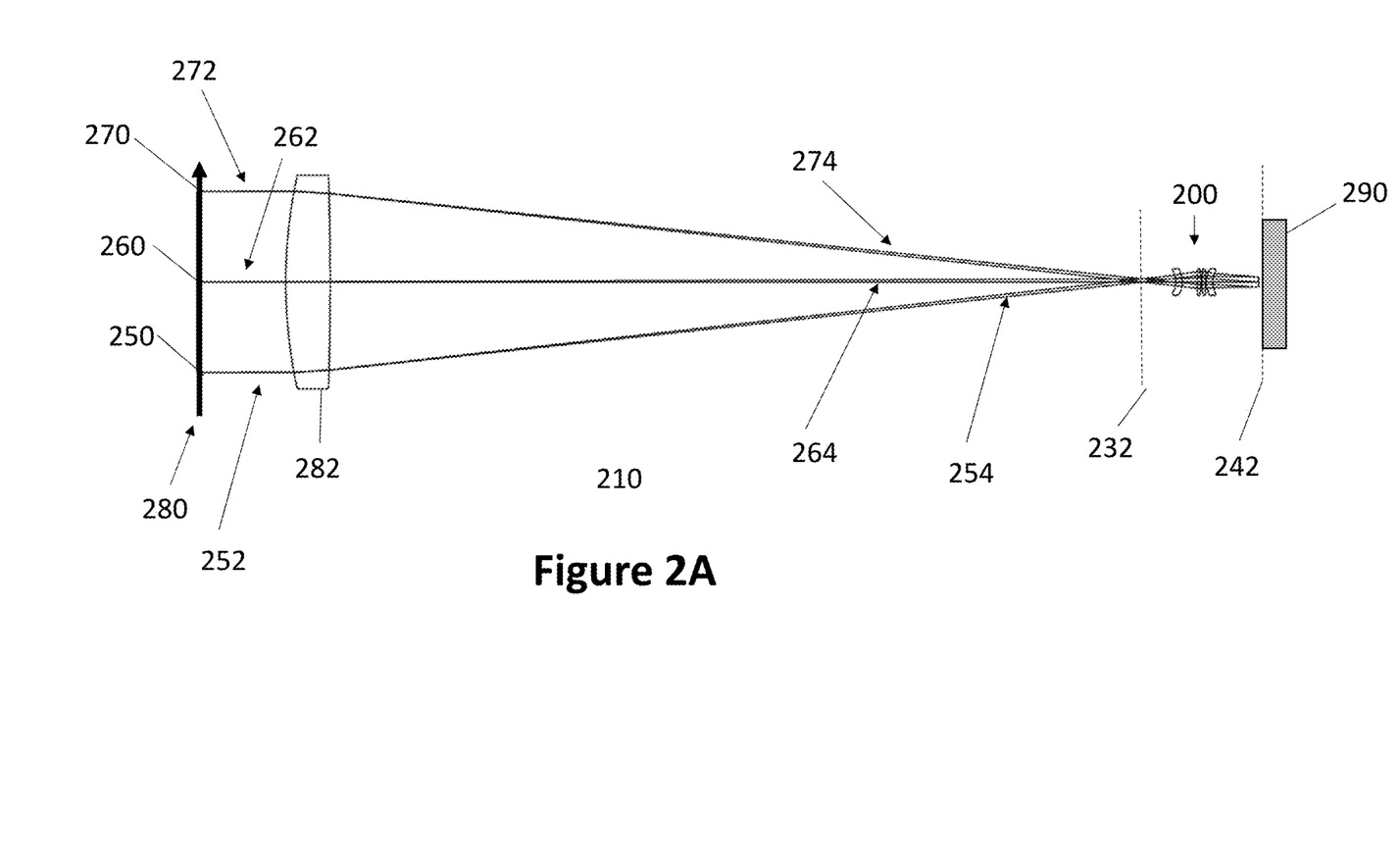
FIG. 2A is a schematic diagram of an eyepiece optical system 200 working in conjunction with other optical elements for imaging a far-field object 280 onto a camera.
Figure 2B:
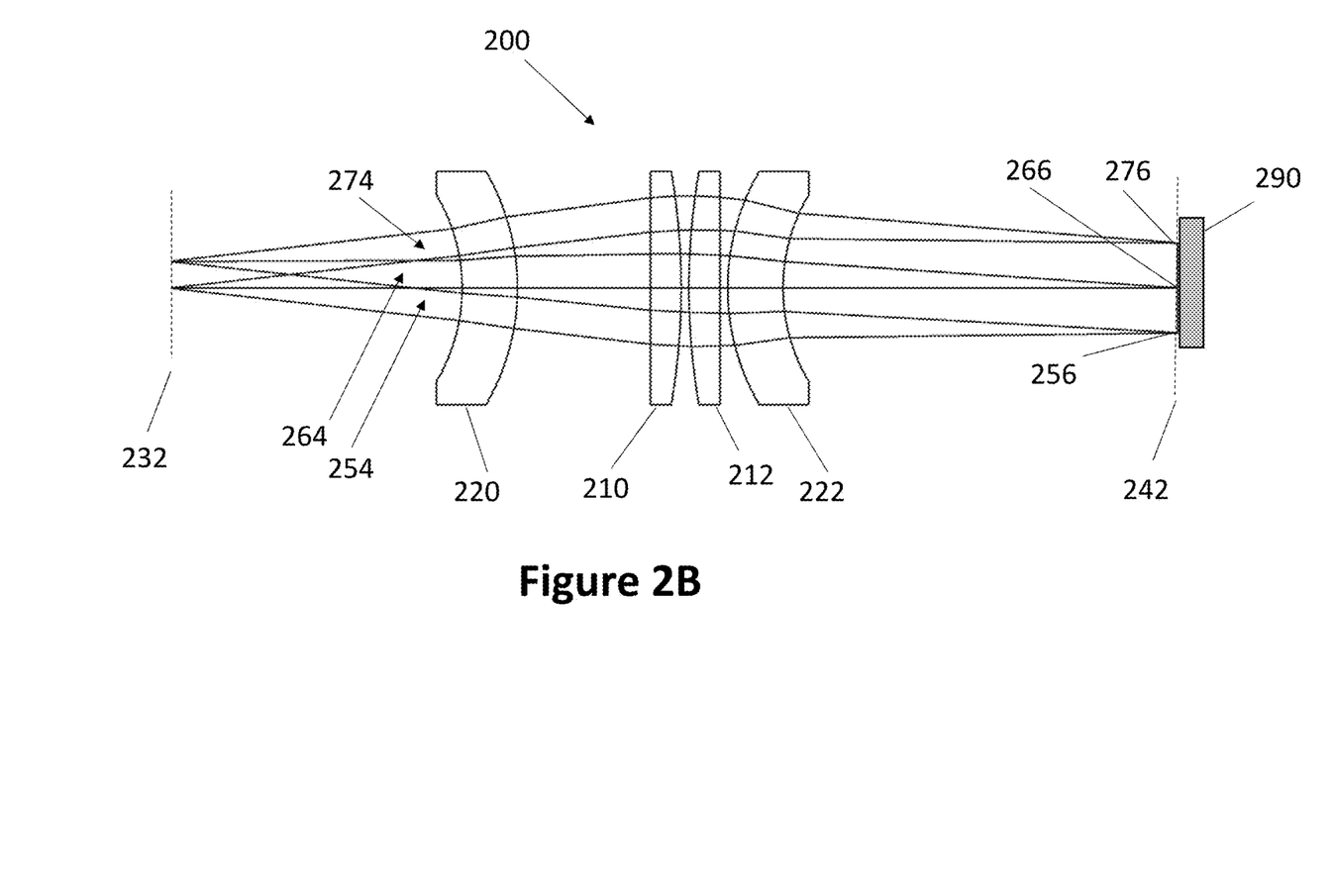
FIG. 2B is an exploded view of the eyepiece optical system 200.

The same optical system 100 (or any optical system with the same functionality) can also be used in reverse to image parallel light bundles in second plane 142 to common points in first plane 132. For example, this is illustrated by optical system 200 in FIGS. 2A and 2B. As shown in FIG. 2A, light rays 252, 262, and 272 emerge from different corresponding field points 250, 260, and 270 of a far-field object 280 and are collimated by a collimating optic 282 to produce three corresponding parallel light bundles 254, 264, 274 at a first plane 232 of an eyepiece optical system 200. The eyepiece optical system 200 combines the light rays for each parallel light bundle at first plane 232 at corresponding image points 256, 266, and 276 on a second (image) plane 242 for the eyepiece optical system 200 to recreate an image of far-field object 280. For example, a camera sensor 290 can be positioned at second plane 242 to record the image. FIG. 2B is an inset for FIG. 2A specifically showing the imaging provided by eyepiece 200 to recreate an image of far-field object 280 on camera sensor 290 from the parallel light bundles at first plane 232. As in FIG. 1, eyepiece 200 includes lenses 210 and 212 generally corresponding to a classic Ramsden eyepiece and a set of one or more additional lenses 220 and 222 for collectively directing light rays between first plane 232 and second plane 242

There is a wide range of embodiments for optical systems 100 and 200 (including 3-lens systems, 4-lens systems, and systems with more than the four lenses). Since any optical design has a complex multi-variable space of parameters, the following is an approximate and non-inclusive range of parameters where the eyepiece has diffraction limited performance across all fields for three and four lens embodiments.

In a three lens embodiment with a finite conjugate as the source, the first and second lenses have a positive lens power of a multiple between 1.5 and 2.5 of the system focal length, the third lens has a negative lens power of a multiple between −8 and −4 of the system focal length, the airspace between the first and second lens has a thickness between 0 and the system focal length, and the airspace between the second and third lens has a thickness of a multiple between 0 and 0.3 of the system focal length, with system parameters of numerical aperture between 0 and 0.25, and a maximum field height of a multiple between 0 and 0.4 of the system focal length. These are described by the following set of inequalities:

$$0 < NA < 0.25 \quad (1)$$

$$0 < FH < (0.4) \cdot EFLsys; \quad (2)$$

$$(1.5) \cdot EFLsys < EFL1 < (2.5) \cdot EFLsys; \quad (3)$$

$$(1.5) \cdot \text{EFLsys} < \text{EFL2} < (2.5) \cdot \text{EFLsys}; \quad (4)$$

$$(-8) \cdot \text{EFLsys} < \text{EFL3} < (-4) \cdot \text{EFLsys}; \quad (5)$$

$$0 < A_{12} < \text{EFLsys}; \quad (6)$$

$$0 < A_{23} < (0.3) \cdot \text{EFLsys}; \quad (7)$$

where NA=numerical aperture, FH=maximum field height, EFLsys=effective focal length of the entire eyepiece system, EFLx=Effective focal length of lens X, and $A_{XY}$=airspace between lenses X and Y.

In a four lens embodiment of the invention with a finite conjugate as the source, the first and fourth lenses have a negative lens power of a multiple between −20 and −1 of the system focal length, the second and third lenses have a positive lens power of a multiple between 1.5 and 3 of the system focal length, and the airspaces between the first and second lens, second and third lens, and third and fourth lens have a thickness between 0 and the system focal length, with system parameters of NA between 0 and 0.25, and a maximum field height of a multiple between 0 and 0.4 of the system focal length. These are described by the following set of inequalities:

$$0 < \text{NA} < 0.25; \quad (8)$$

$$0 < \text{FH} < (0.4) \cdot \text{EFLsys}; \quad (9)$$

$$(-20) \cdot \text{EFLsys} < \text{EFL1} < (-1) \cdot \text{EFLsys}; \quad (10)$$

$$(1.5) \cdot \text{EFLsys} < \text{EFL2} < 3 \cdot \text{EFLsys}; \quad (11)$$

$$(1.5) \cdot \text{EFLsys} < \text{EFL3} < 3 \cdot \text{EFLsys}; \quad (12)$$

$$(-20) \cdot \text{EFLsys} < \text{EFL4} < (-1) \cdot \text{EFLsys}; \quad (13)$$

$$0 < A_{12} < \text{EFLsys}; \quad (14)$$

$$0 < A_{23} < \text{EFLsys}; \quad (15)$$

$$0 < A_{34} < \text{EFLsys}. \quad (16)$$

Figure 3:
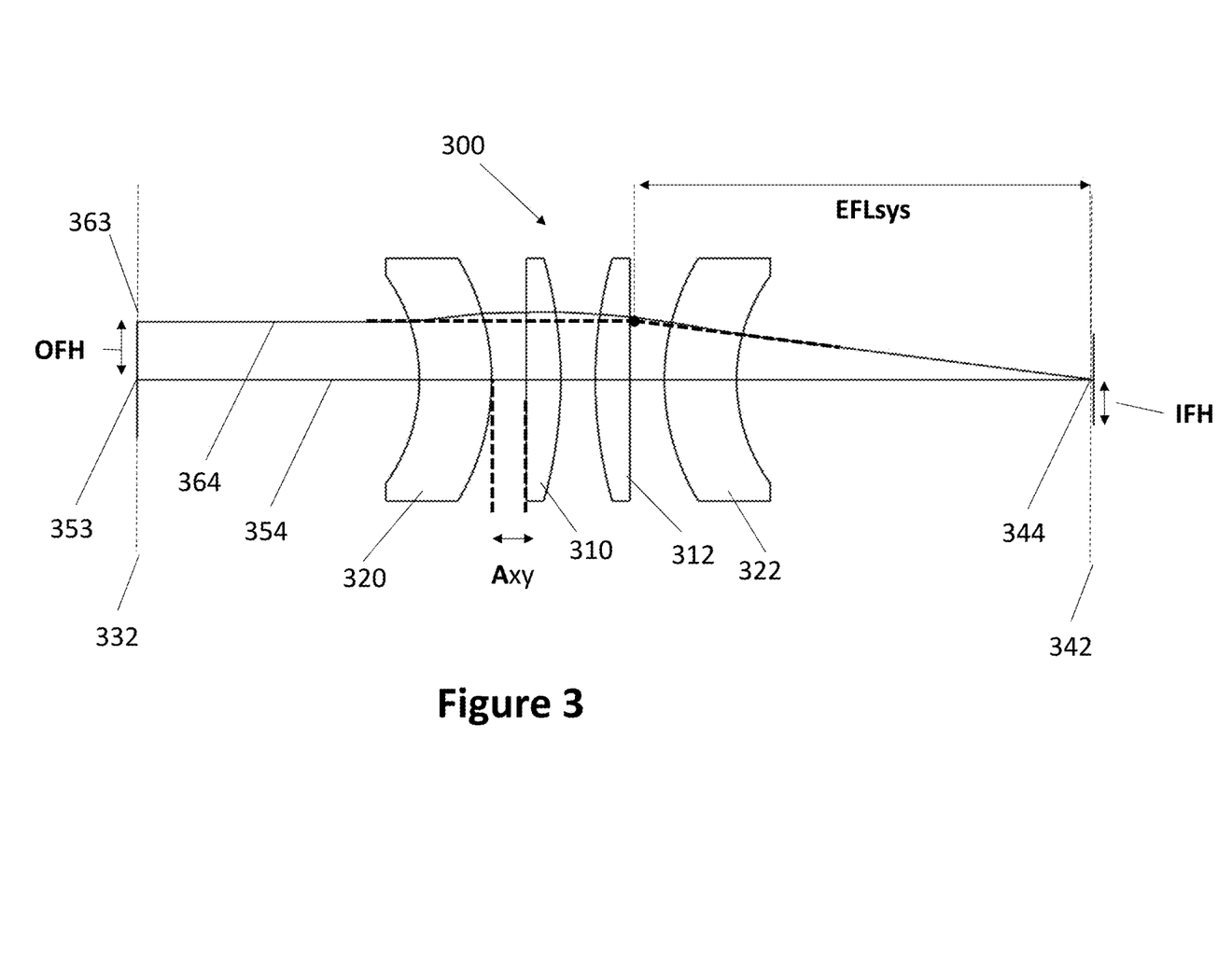
FIG. 3 is a schematic diagram of an eyepiece optical system 300 illustrating different parameters used to design the system.
Figure 4:
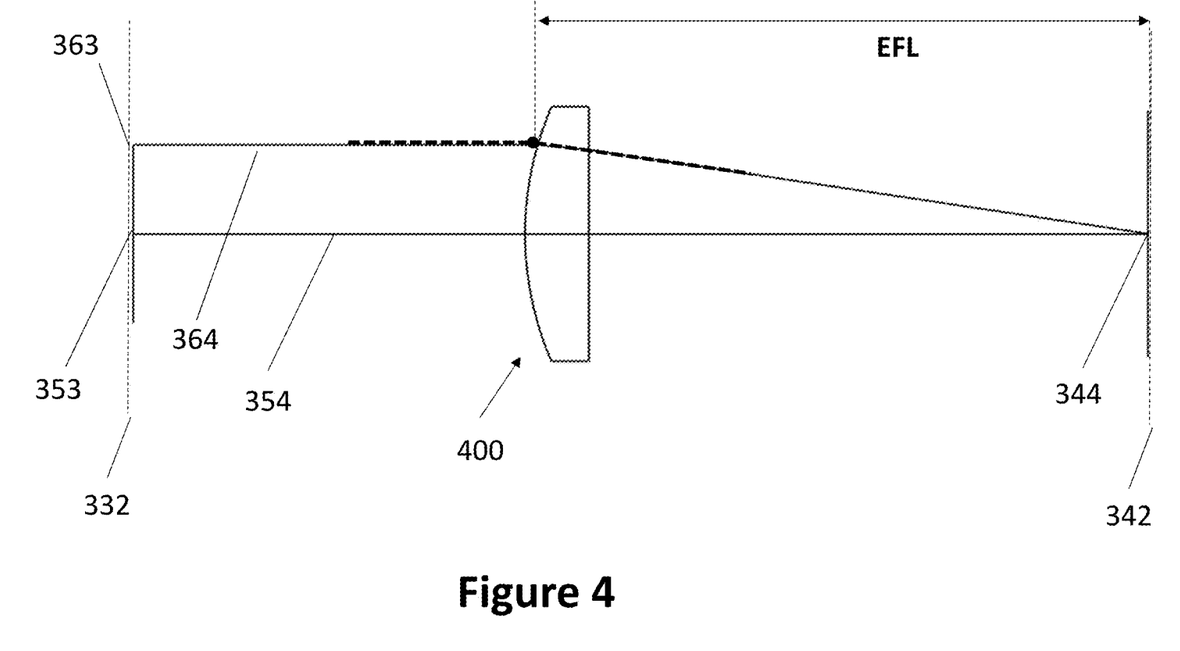
FIG. 4 is a schematic diagram illustrating the effective focal length of a single lens system.
Figure 5:
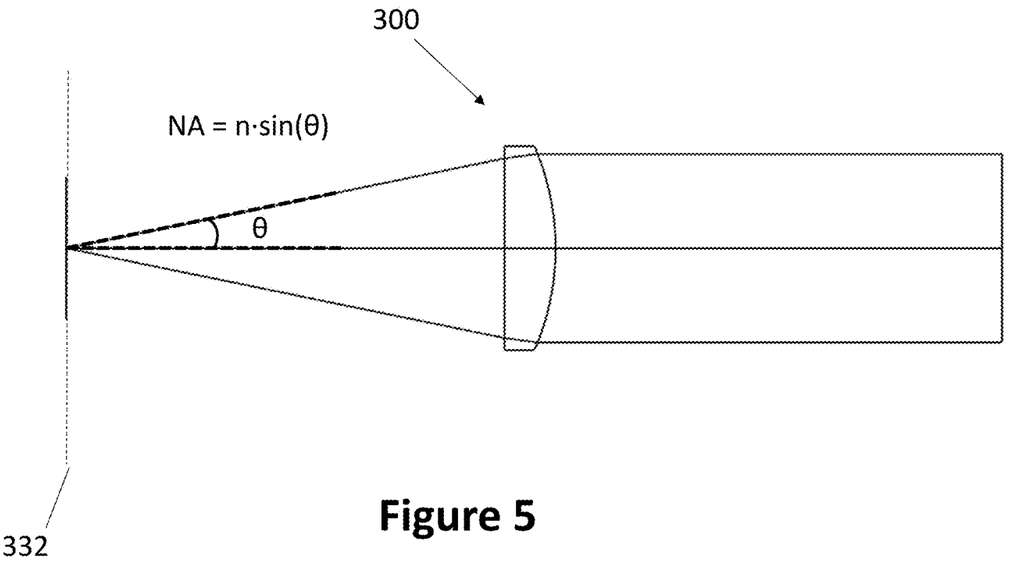
FIG. 5 is a schematic diagram illustrating the numerical aperture of illumination light.

FIGS. 3-5 are schematic diagrams illustrating these parameters. FIG. 3 illustrates optical system 300 including lenses 310, 312, 320, and 322 directing parallel rays 354 and 364 from an on-axis field point 353 and a maximal radius field point 363 in a first plane 332 to a common image point 344 on a second plane 342. The effective focal length for any optical system is generally defined as the distance between: 1) the intersection of a) the maximal-radius ray of a collimated beam input, extended infinitely, and b) the maximal-radius ray of the resultant focused beam, extended infinitely; and 2) the point where the optical system produces the smallest focused spot size from 1b above, projected perpendicular to the optical axis up to the line in 1a. This is illustrated schematically in FIG. 3 as EFLsys for system 300 as a whole. FIG. 4 illustrates the effective focal length EFL for a single lens 400.

FIG. 3 also illustrates the field height FH for the system 300, which corresponds to an object field height or an image field height depending on how the optical system 300 is being used. When system 300 is being used as a conventional eyepiece to collimate a radial range of object points (as in FIG. 1), the field height FH is the object field height OFH and is the radial range of object points that can be collimated by the eyepiece, as limited by the object being imaged, or limited by mechanical apertures of the optical system. When the system 300 is being used in reverse as in FIG. 2B to focus different bundles of parallel rays to corresponding image points, the field height FH is the image field height IFH and is the radial range of image points that have been focused by the eyepiece, as limited by the sensor, or limited by mechanical apertures of the optical system. FIG. 3 also illustrates the airspace Axy between two lenses (in this case lenses 310 and 320), which is the distance in air between the two lenses as measured along the optical axis 302.

Finally FIG. 5 illustrates the numerical aperture NA, which like the field height FH, corresponds to either the object side or the image side depending on how optical system 300 is used. When system 300 is being used as a conventional eye-piece to collimate a radial range of object points (as in FIG. 1), the numerical aperture NA is the object side NA as in FIG. 5, and corresponds to the usual equation NA=n·sin(θ), where n is the index of refraction of the medium, and θ is the half angle of the illumination emerging from first plane 332. When the system 300 is being used in reverse as in FIG. 2B to focus different bundles of parallel rays to corresponding image points, the numerical aperture NA is the image side NA and corresponds to the same usual equation NA=n·sin(θ), except that θ is now the half angle of the illumination being focused onto second plane 342.

Conventional optical design software based on ray tracing, such as CODE V Optical Design Software from Synopsys, FRED Optical Engineering Software from Photon Engineering, or OpticsStudio® from Zemax, among others, may be used to determine various embodiments of the inventions based on the design specifications above. For example, after generally setting forth the target NA, FH, and EFLsys for the system and the number of lenses (for example, three or four lenses), the constraints above may be used to sufficiently narrow the parameter space so that conventional optical design software can numerically determine a suitable prescription for the overall system (e.g., curvature at each surface, and index of refraction and distances between consecutive surfaces) subject to tolerances for optical quality. For example, the numerical optimization targets may set to be "diffraction-limited," which herein is generally understood to mean a peak-valley wave front is no larger than 0.25 waves at any field point. However, in certain embodiments, a performance that is less than diffraction-limited may still be suitable.

For many applications, the NA is set to at least 0.05 and the FH is set to at least as large as (0.05)·ELFsys. The design is not limited to specific types of lenses or glasses. For example, any common glasses may be used, such as S-LAH58 or other glasses providing common indices of refraction from about n=1.4 up to n=2.1 in the visible light spectrum. Similarly, the design is not limited to a specific range of curvatures for the lens surfaces. For example, in certain embodiments, the powered surfaces of the lenses may have an absolute radius of curvature in range of about 5 mm up to about 1000 mm, or more specifically, in the range of about 10 mm up to about 300 mm.

Furthermore, in certain embodiments, Ramsden or Ramsden-like lenses comprise two out of the three or four lenses in the eyepiece optical systems, with these lenses in the center of the eyepiece. Ramsden-like lenses typically have a flat outer surface on each lens, and "Ramsden-like lenses" means those lenses may have two curved surfaces on the inner and outer surfaces of each lens. For example, a "flat" surface may be understood to mean a surface with a radius of curvature greater than 2500 mm. The additional one or two lenses in the eyepiece correct the aberrations of the center Ramsden or Ramsden-like lenses, with the primary correction being spherical aberration and the secondary correction being distortion; these one or two lenses are in the front or back of the eyepiece. With four lenses, some embodiments of this invention may be symmetric; that is to say, the first lens and the last lens are equivalent, but reversed in direction; the second and third lens are equivalent, but reversed in direction; and the airspace between the first and second lens is equivalent to the airspace between the third and fourth lens. With four symmetric lenses, the embodiments of the eyepiece may be used from either direction; that is to say, using it forward to backward will produce the same result as using it backward to forward. With three lenses, the embodiments only need one outer lens to primarily correct the spherical aberration and secondarily correct the distortion of the inner lenses.

The following are specific embodiments of the inventive eyepiece optical system. As explained above, however, there is a wide range of embodiments for this invention, so the following is not inclusive of all possible embodiments. All the following embodiments are diffraction limited, meaning the peak-valley wave front is no larger than 0.25 waves at any field point. The system parameters are different for each embodiment.

Figure 6:
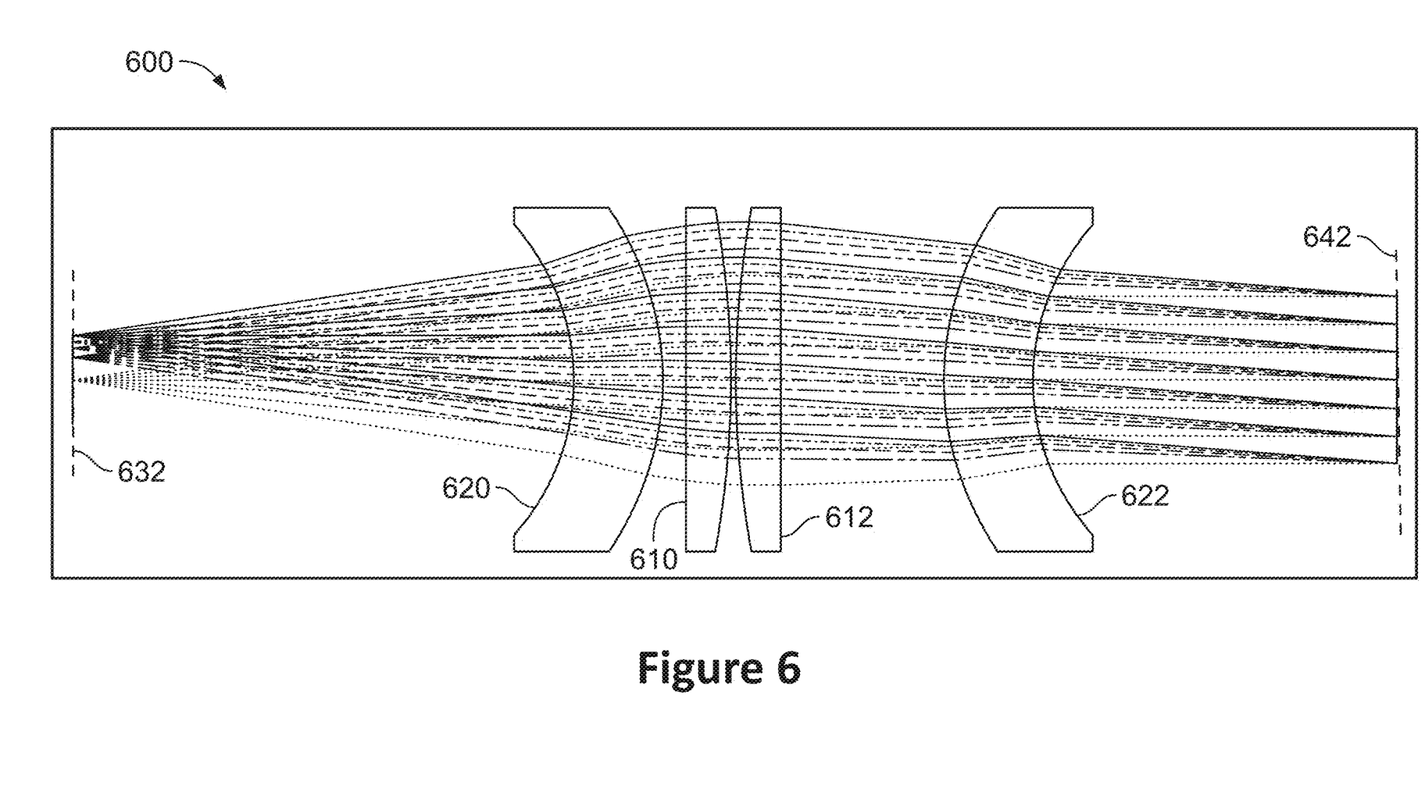
FIG. 6 is a ray trace diagram of one specific embodiment of an eyepiece optical system 600 formed by four lenses.

FIG. 6 is a ray-trace diagram for an optical system 600 that collimates rays emerging from different field points on object plane 632 to corresponding bundles of parallel rays at image place 642, with the rays from different object field points corresponding to different colored ray bundles. System 600 is designed to have an NA of 0.15, a maximum field height FH of 4 mm, and a system focal length EFLsys of 50 mm at 633 nm. The optical system 600 includes a non-symmetric arrangement of four lenses 610, 612, 620, and 622. The middle two lenses 610 and 612 are Ramsden-lenses having two plano-convex lenses with the curved surfaces facing one another. Additional lenses 620 and 622 are added to improve optical performance and the system as a whole satisfies the constraints of Equations (8)-(16). Specifically, EFL1 and EFL4 are −263.833 mm, EFL2 and EFL3 are 101.411 mm, $A_{12}$ is 2.149 mm, $A_{23}$ is 0.500 mm, and $A_{34}$ is 14.769 mm.

For comparison, Tables 1 and 2 below show the Seidel aberration coefficients of a classic Ramsden optical system also optimized for an NA of 0.15, a maximum field height FH of 4 mm, and system focal length EFLsys of 50 mm at 633 nm and those for optical system 600, respectively. As shown, the spherical aberration coefficient for system 600 is reduced by a factor of 10, and the distortion aberration coefficient for system 600 is reduced by a factor of 15. In addition, with these system parameters, the peak-valley wave front at the maximum field height of the classic Ramsden optical system is approximately 1.12 waves, and the peak-valley wave front at the maximum field height of optical system 600 is approximately 0.12 waves. Therefore, the peak-valley wave front is reduced by nearly a factor of 10 when comparing this example embodiment of the invention to a classic Ramsden eyepiece.

TABLE 1

| Surface | Spherical | Coma | Astigmatism | Field Curvature | Distortion |
|---|---|---|---|---|---|
| 1 | 0.017 | 0.000 | 0.000 | 0.000 | 0.000 |
| 2 | 0.000 | 0.000 | −0.002 | 0.000 | −0.018 |
| 3 | 0.015 | 0.000 | 0.000 | 0.000 | 0.000 |
| 4 | 0.000 | 0.000 | 0.000 | 0.000 | 0.003 |
| Total | 0.032 | 0.000 | −0.002 | 0.000 | −0.015 |

TABLE 2

| Surface | Spherical | Coma | Astigmatism | Field Curvature | Distortion |
|---|---|---|---|---|---|
| 1 | 0.006 | 0.007 | 0.007 | 0.000 | 0.008 |
| 2 | −0.008 | −0.007 | −0.007 | 0.000 | −0.007 |
| 3 | 0.025 | 0.002 | 0.000 | 0.000 | 0.000 |
| 4 | 0.000 | −0.001 | −0.001 | 0.000 | −0.003 |
| 5 | 0.020 | 0.002 | 0.000 | 0.000 | 0.000 |
| 6 | 0.000 | 0.000 | 0.001 | 0.000 | 0.003 |
| 7 | 0.049 | 0.008 | 0.001 | 0.000 | 0.000 |
| 8 | −0.089 | −0.011 | −0.001 | 0.000 | 0.000 |
| Total | 0.003 | 0.000 | 0.000 | 0.000 | 0.001 |

The lens prescriptions for the classic Ramsden optical system and optical system 600 are set forth in Tables 3 and 4, respectively, below, and set forth the radius of curvatures in mm of each surface defined by the respective lens system, the distance in mm ("thickness") to each such subsequent surface, and the material between each set of surfaces (where a blank indicates air). The glass material is S-LAH58, which has an index of refraction Nd of 1.883, and it or similar such glasses are readily available from commercial glass vendors such as Ohara Corp, Schott, Hoya Optics, and CDGM Glass.

TABLE 3

| Radius | Thickness | Material |
|---|---|---|
| Infinity | 45.139 | |
| Infinity | 8.000 | S-LAH58 |
| −87.630 | 0.500 | |
| 87.630 | 8.000 | S-LAH58 |
| Infinity | 45.491 | |

TABLE 4

| Radius | Thickness | Material |
|---|---|---|
| Infinity | 45.159 | |
| −20.974 | 8.000 | S-LAH58 |
| −27.174 | 2.149 | |
| Infinity | 4.000 | S-LAH58 |
| −89.091 | 0.500 | |
| 89.091 | 4.000 | S-LAH58 |
| Infinity | 14.769 | |
| 27.174 | 8.000 | S-LAH58 |
| 20.974 | 32.758 | |

Figure 7:
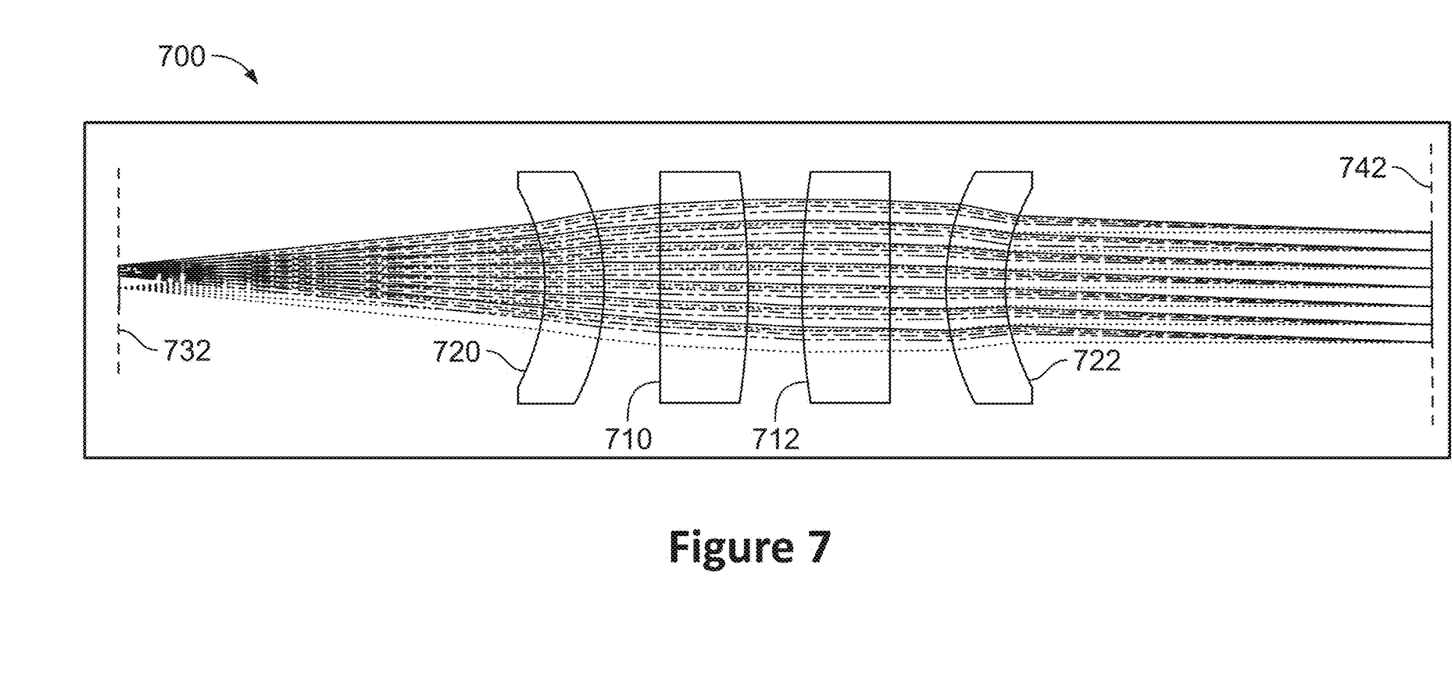
FIG. 7 is a ray trace diagram of one specific embodiment of an eyepiece optical system 700 formed by four lenses in a symmetric arrangement.

FIG. 7 is a ray-trace diagram for another optical system 700 that collimates rays emerging from different field points on object plane 732 to corresponding bundles of parallel rays at image place 742, with the rays from different object field points corresponding to different colored ray bundles. System 700 is designed to have an NA of 0.1, a maximum field height FH of 2 mm, and a system focal length EFLsys of 50 mm at 633 nm. The optical system 700 includes a symmetric arrangement of four lenses 710, 712, 720, and 722. The middle two lenses 710 and 712 are Ramsden-lenses having two plano-convex lenses with the curved surfaces facing one another. Additional lenses 720 and 722 are symmetrically positioned and added to improve optical performance and the system as a whole satisfies the constraints of Equations (8)-(16). Specifically, EFL1 and EFL4 are −417.437 mm, EFL2 and EFL3 are 104.175 mm, and $A_{12}$, $A_{23}$, and $A_{34}$ are 5.000 mm.

The lens prescriptions for symmetric optical system 700 are set forth in Table 5 below, where the units are once again in mm and the glass material is again S-LAH58.

TABLE 5

| Radius | Thickness | Material |
|---|---|---|
| Infinity | 38.579 | |
| −18.132 | 5.447 | S-LAH58 |
| −21.755 | 5.000 | |
| Infinity | 8.000 | S-LAH58 |
| −91.518 | 5.000 | |
| 91.518 | 8.000 | S-LAH58 |
| Infinity | 5.000 | |
| 21.755 | 5.447 | S-LAH58 |
| 18.132 | 38.595 | |

Figure 8:
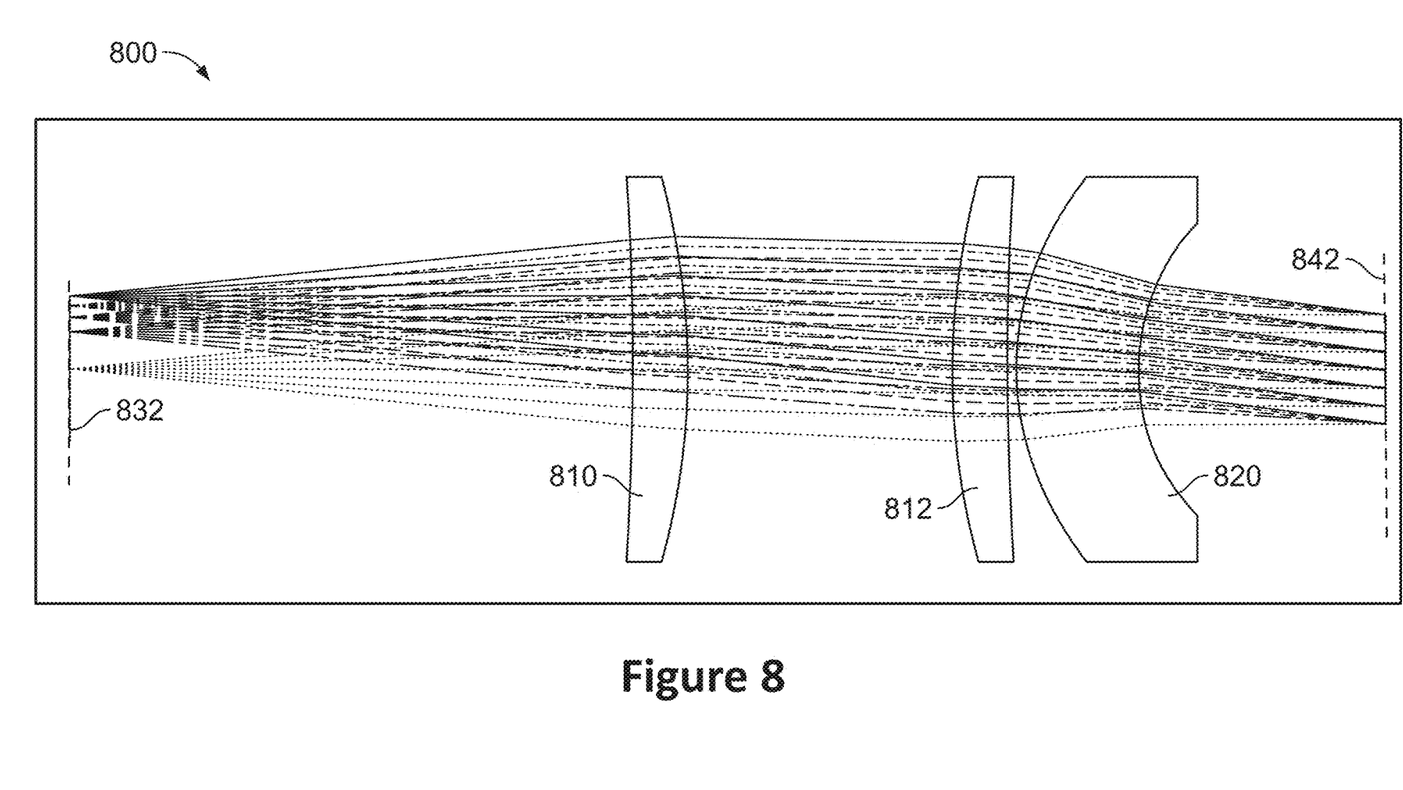
FIG. 8 is a ray trace diagram of one specific embodiment of an eyepiece optical system 800 formed by three lenses.

FIG. 8 is a ray-trace diagram for another optical system 800 that collimates rays emerging from different field points on object plane 832 to corresponding bundles of parallel rays at image place 842, with the rays from different object field points corresponding to different colored ray bundles. System 800 is designed to have an NA of 0.1, a maximum field height FH of 4 mm, and a system focal length EFLsys of 30 mm at 633 nm. The optical system 800 includes three lenses 810, 812, and 820. The middle two lenses 810 and 812 are Ramsden lenses. Lens 820 is a third lens to further optimize performance and the system as a whole satisfies the constraints of Equations (1)-(7). Specifically, EFL1 and EFL2 are 58.285 mm, EFL3 is −133.029, $A_{12}$ is 14.462 mm, and $A_{23}$ is 0.500 mm.

The lens prescriptions for symmetric optical system 800 are set forth in Table 6 below, where the units are once again in mm and the glass material is again S-LAH58.

TABLE 6

| Radius | Thickness | Material |
|---|---|---|
| Infinity | 30.178 | |
| −161.850 | 3.000 | S-LAH58 |
| −39.235 | 14.462 | |
| 39.235 | 3.000 | S-LAH58 |
| 161.850 | 0.500 | |
| 16.207 | 6.628 | S-LAH58 |
| 11.511 | 13.546 | |

Figure 9:
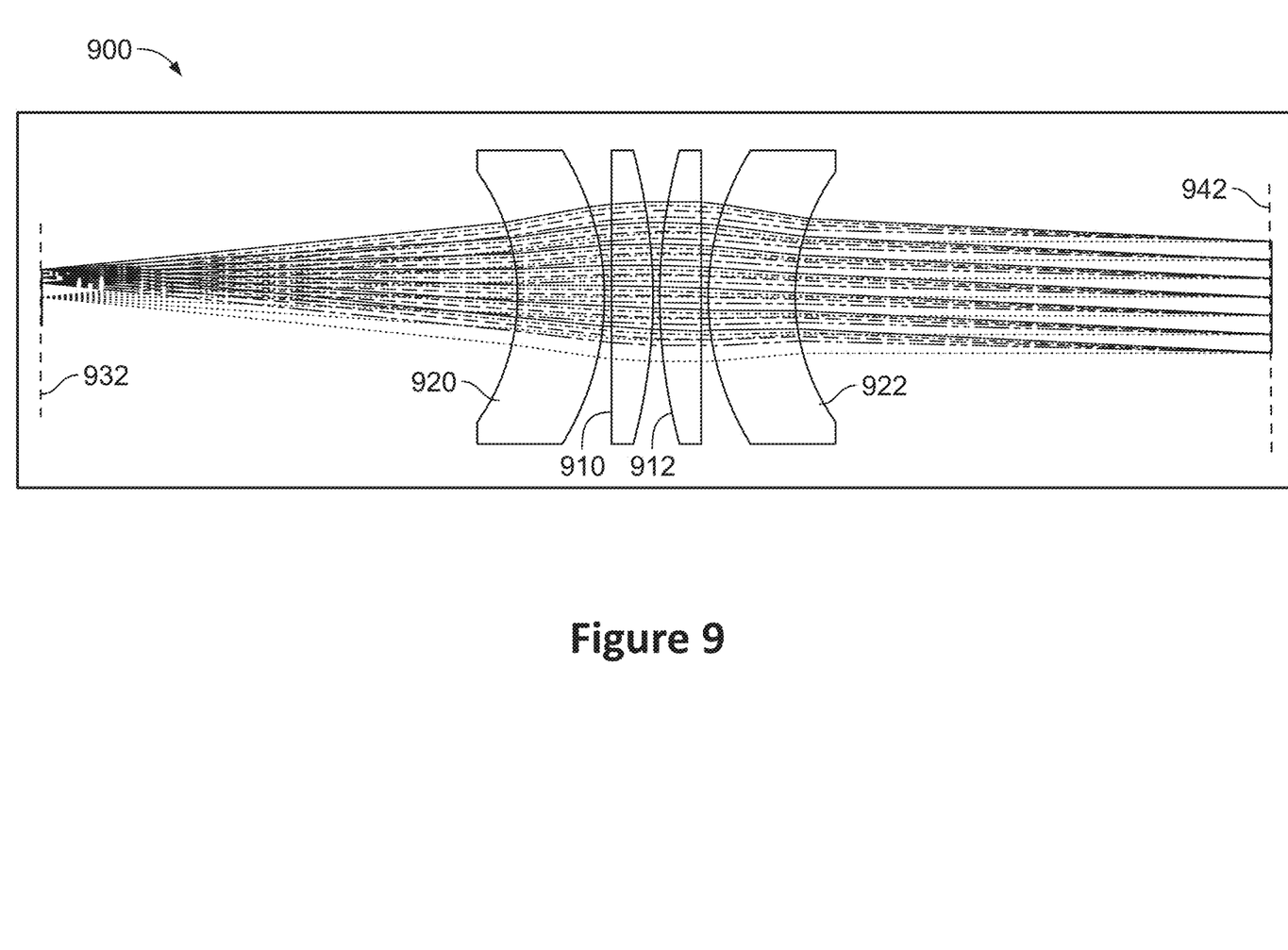
FIG. 9 is a ray trace diagram of one specific embodiment of an eyepiece optical system 900 formed by four lenses and using a lower-index glass.

FIG. 9 is a ray-trace diagram for yet another optical system 900 that collimates rays emerging from different field points on object plane 932 to corresponding parallel rays at image place 942, with the rays from different object field points corresponding to different colored ray bundles. System 900 is designed to have an NA of 0.1, a maximum field height FH of 2 mm, and a system focal length EFLsys of 40 mm at 633 nm. The optical system 900 includes a symmetric arrangement of four lenses 910, 912, 920, and 922. The middle two lenses 910 and 912 are Ramsden-lenses having two plano-convex lenses with the curved surfaces facing one another. Additional lenses 920 and 922 are symmetrically positioned and added to improve optical performance and the system as a whole satisfies the constraints of Equations (8)-(16). Specifically, EFL1 and EFL4 are −217.023 mm, EFL2 and EFL3 are 74.213 mm, and $A_{12}$, $A_{23}$ and $A_{34}$ are 0.500 mm.

The lens prescriptions for symmetric optical system 900 are set forth in Table 7 below, where the units are once again in mm. In this embodiment, the glass material is S-BSL7, which has an index of refraction Nd of 1.516, and is also readily commercially available. The lower index glass used in this embodiments relative to that in systems 600, 700, and 800 demonstrates how the general design criteria set forth in Equations 1-16 can be used over a range of component parameters.

TABLE 7

| Radius | Thickness | Material |
|---|---|---|
| Infinity | 34.254 | |
| −15.330 | 6.266 | S-BSL7 |
| −20.237 | 0.500 | |
| Infinity | 3.000 | S-BSL7 |
| −38.191 | 0.500 | |
| 38.191 | 3.000 | S-BSL7 |
| Infinity | 0.500 | |
| 20.237 | 6.266 | S-BSL7 |
| 15.330 | 34.284 | |

Although FIGS. 6-9 show the optical systems being used to collimates rays emerging from different field points on the object plane 932 to corresponding bundles of parallel rays at image place 942, any of the systems 600, 700, 800, and 900 can be used in reverse to image parallel light bundles in the image plane to common points in the object plane, as generally described above with respect to FIG. 2.

Scope

It must be noted that as used herein and in the appended claims, the singular forms "a", "an", and "the" include plural referents unless the context clearly dictates otherwise, e.g., when the word "single" is used.

As used herein, the terms "adapted" and "configured" mean that the element, component or other subject matter is designed and/or intended to perform a given function. Thus, the use of the terms "adapted" and "configured" should not be construed to mean that a given element, component, or other subject matter is simply "capable of" performing a given function.

As used herein, the phrases "at least one of" and "one or more of," in reference to a list of more than one entity, means any one or more of the entity in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entity so conjoined. Other entity may optionally be present other than the entity specifically identified by the "and/or" clause, whether related or unrelated to those entities specifically identified.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments of the invention have been described. Nevertheless, it will be understood that various modifications may be made without departing from the spirit and scope of the invention. Accordingly, other embodiments are within the scope of the following claims.

What is claimed is:

1. An optical module for directing light rays between a first plane and a second plane, the optical module comprising:
   a. at least three lens elements, wherein the lens elements collectively set a numerical aperture NA and a field height FH for directing the light rays between the first and second planes, and further collectively set a system effective focal length EFLsys, wherein NA, FH, and EFLsys satisfy:
      i. $0 < NA < 0.25$; and
      ii. $0 < FH < (0.4) \cdot (EFLsys)$,
   b. wherein the at least three lens elements include first and second adjacent lens elements having effective focal lengths EFL1 and EFL2, respectively, satisfying:
      i. $(1.5) \cdot (EFLsys) < EFL1 < 3 \cdot (EFLsys)$; and
      ii. $(1.5) \cdot (EFLsys) < EFL2 < 3 \cdot (EFLsys)$,
   c. wherein an air-distance between the first and second lens elements $A_{12}$ satisfies:
      i. $0 < A_{12} < EFLsys$,
   d. wherein the at least three lens elements includes a third lens element adjacent the second lens elements opposite the first lens element and having an effective focal length EFL3 satisfying:
      i. $(-20) \cdot EFLsys < EFL3 < (-1) EFLsys$, and
   e. wherein an air-distance between the second and third lens elements $A_{23}$ satisfies:
      i. $0 < A_{23} < EFLsys$.

2. The optical module of claim 1, wherein:
   a. $0.05 < NA < 0.25$; and
   b. $(0.05) \cdot (EFLsys) < FH < (0.4) \cdot (EFLsys)$.

3. The optical module of claim 2, wherein:
   a. $(-10) \cdot (EFLsys) < EFL3 < (-1) \cdot (EFLsys)$;
   b. $0 < A23 < (0.3) \cdot (EFLsys)$.

4. The optical module of claim 3, wherein: $(-10) \cdot (EFLsys) < EFL3 < (-4) \cdot (EFLsys)$.

5. The optical module of claim 4, wherein: $(-8) \cdot (EFLsys) < EFL3 < (-4) \cdot (EFLsys)$.

6. The optical module of claim 5, wherein:
   a. $(1.5) \cdot (EFLsys) < EFL1 < (2.5) \cdot (EFLsys)$; and
   b. $(1.5) \cdot (EFLsys) < EFL2 < (2.5) \cdot (EFLsys)$.

7. The optical module of claim 6, wherein the at least three lens elements comprises exactly three lens elements.

8. The optical module of claim 1, wherein the at least three lens elements comprises a fourth lens element adjacent the first lens element opposite the second lens element and having an effective focal length EFL4, and wherein an air-distance $A_{41}$ between the fourth and first lens elements satisfies: $0 < A_{41} < EFLsys$.

9. The optical module of claim 8, wherein:
   a. $(-20) \cdot (EFLsys) < EFL3 < (-1) \cdot (EFLsys)$; and
   b. $(-20) \cdot (EFLsys) < EFL4 < (-1) \cdot (EFLsys)$.

10. The optical module of claim 9, wherein:
    a. $(-20) \cdot (EFLsys) < EFL3 < (-5) \cdot (EFLsys)$; and
    b. $(-20) \cdot (EFLsys) < EFL4 < (-5) \cdot (EFLsys)$.

11. The optical module of claim 10, wherein the at least three lens elements comprises exactly four lens elements.

12. The optical module of claim 10, wherein the fourth lens element comprises a convex surface facing the adjacent first and second lens elements and a concave surface opposite the adjacent first and second lens elements.

13. The optical module of claim 12, wherein the third lens element comprises a convex surface facing the adjacent first and second lens elements and a concave surface opposite the adjacent first and second lens elements.

14. The optical module of claim 1, wherein the at least three lens elements are configured to cause light rays having common angles at one plane to correspond to light rays having common field points in the other plane.

15. The optical module of claim 14, wherein the light rays having common angles comprise different bundles of parallel light rays incident on an image plane over a range of angles and wherein the at least three lens elements are configured to cause the light rays in each bundle to result from light rays emerging from a corresponding one of the common field points in an object plane, and wherein the NA and FH correspond to the light rays emerging from the object plane.

16. The optical module of claim 14, wherein the light rays having common angles comprise different bundles of parallel light rays emerging from an object plane over a range of angles and wherein the at least three lens elements are configured to cause the light rays in each bundle to be combined at a corresponding one of the common field points in the image plane, and wherein the NA and FH correspond to the light rays being combined in the image plane.

17. The optical module of claim 1, wherein the lens elements provide diffraction-limited imaging between the object and image planes.

18. The optical module of claim 17, wherein the diffraction limited imaging means that a peak-valley wavefront is no larger than 0.25 waves at any field point.

19. The optical module of claim 1, wherein EFLsys is between 10 mm and 300 mm.

20. The optical module of claim 1, where the lens elements each have a refractive index between 1.4 and 2.1 for wavelengths between 380 nm and 750 nm.

21. The optical module of claim 1, wherein the lens elements each have at least one surface with an absolute radius of curvature between 5 mm and 1000 mm.

22. The optical module of claim 1, wherein the adjacent first and second lens elements comprise convex surfaces facing one another.

23. The optical module of claim 22, wherein the outer surfaces of the adjacent first and second lens elements are nominally flat.

24. The optical module of claim 1, where the third lens element comprises a convex surface facing the adjacent first and second lens elements and a concave surface opposite the adjacent first and second lens elements.

25. An optical observation apparatus for use with the human eyes comprising the optical module of claim 1, wherein the optical module is configured for use as an eyepiece for the optical observation apparatus.

26. The optical observation apparatus of claim 25, further comprising a magnifying or de-magnifying system coupled to the eyepiece.

27. An optical system for observing an object, the system comprising: a light source for illuminating the object to cause light rays emerging from the object, a detector, and the optical module of any of the preceding claims positioned optically between the light source and the detector for assisting imaging of the object onto the detector.

28. The optical system of claim 27, further comprising an optical collimation module position optically between the light source and the optical module of claim 27 for collimating the light emerging from the object.

* * * * *

UNITED STATES PATENT AND TRADEMARK OFFICE
CERTIFICATE OF CORRECTION

PATENT NO. : 11,966,041 B2
APPLICATION NO. : 17/883954
DATED : April 23, 2024
INVENTOR(S) : Nicholas Mark Cirucci It is certified that error appears in the above-identified patent and that said Letters Patent is hereby corrected as shown below:

In the Claims

Column 11
Line 41, in Claim 1, delete "0 <FH<" and insert -- 0<FH< --
Line 44, in Claim 1, delete "EFL1 and EFL2" and insert -- EFL1 and EFL2 --
Line 54, in Claim 1, delete "(-1)EFLsys," and insert -- (-1)·EFLsys, --
Line 63, in Claim 3, delete "<A23<" and insert -- <$A_{23}$< --

Signed and Sealed this
Eleventh Day of June, 2024

Katherine Kelly Vidal
*Director of the United States Patent and Trademark Office*